(No Model.) 3 Sheets—Sheet 1.

B. WILLIAMS.
UNDERGROUND ELECTRICAL CONDUIT.

No. 354,290. Patented Dec. 14, 1886.

Witnesses:
Harry T. Jones
Albert H. Adams

Inventor:
Benezette Williams

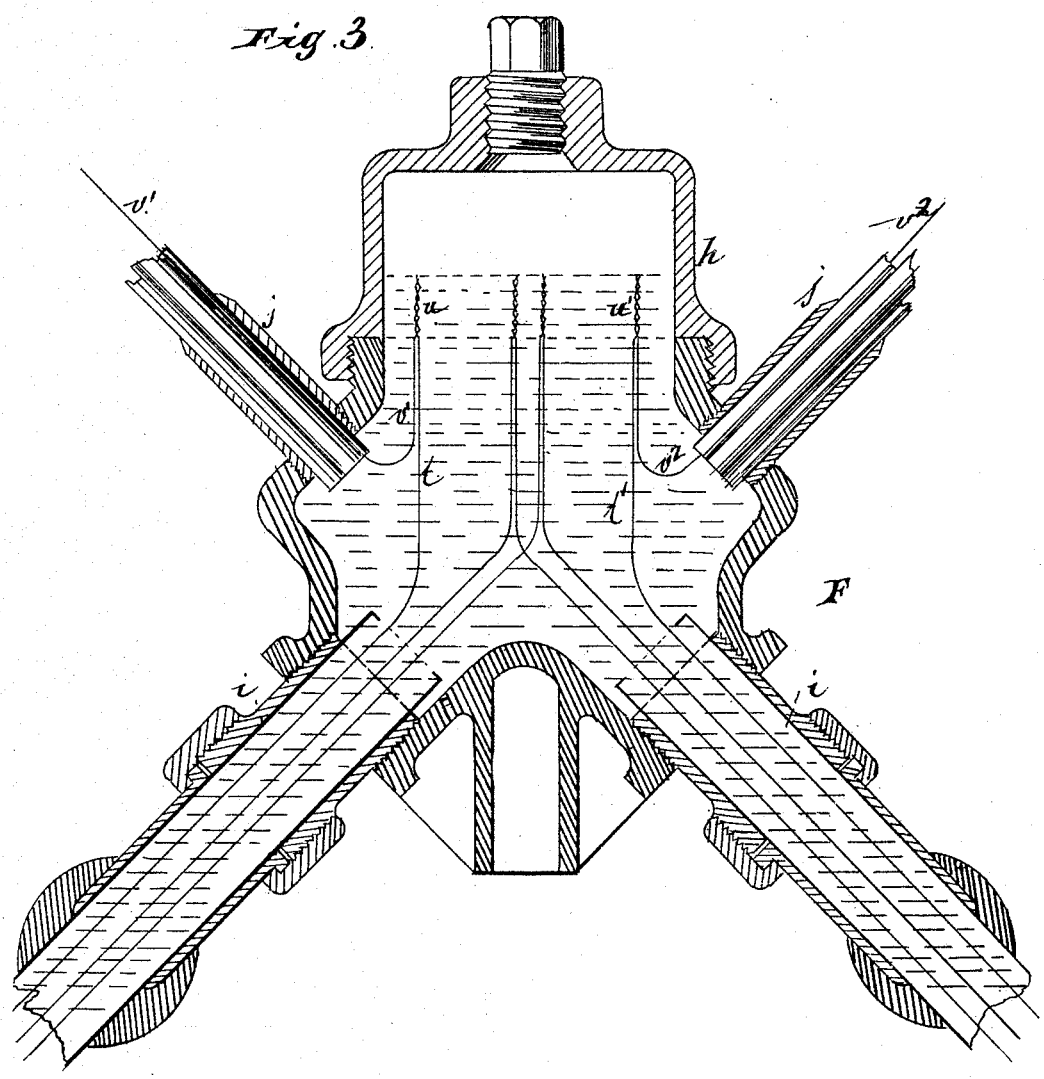

(No Model.) 3 Sheets—Sheet 3.
B. WILLIAMS.
UNDERGROUND ELECTRICAL CONDUIT.
No. 354,290. Patented Dec. 14, 1886.
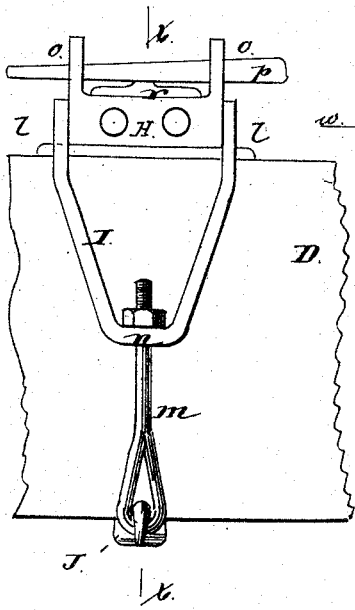
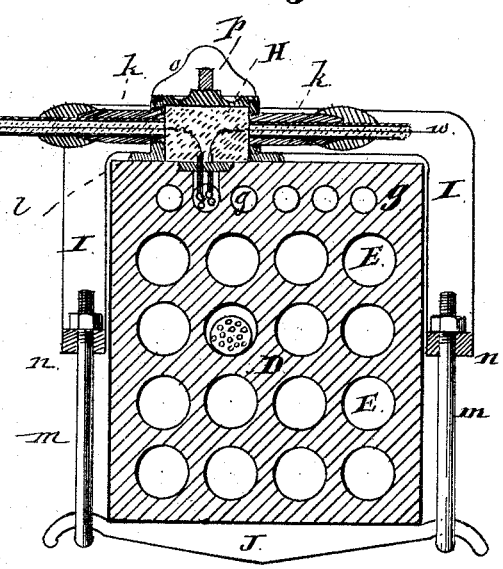
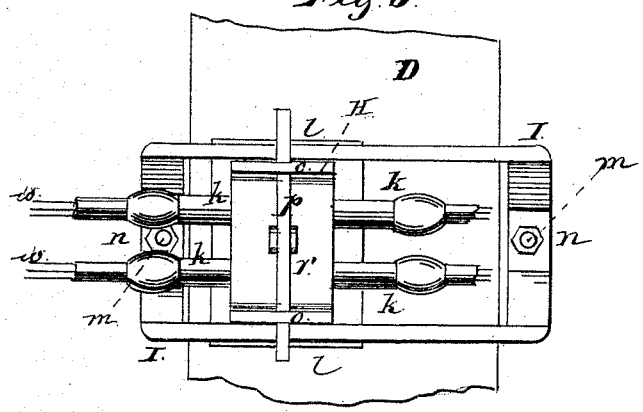
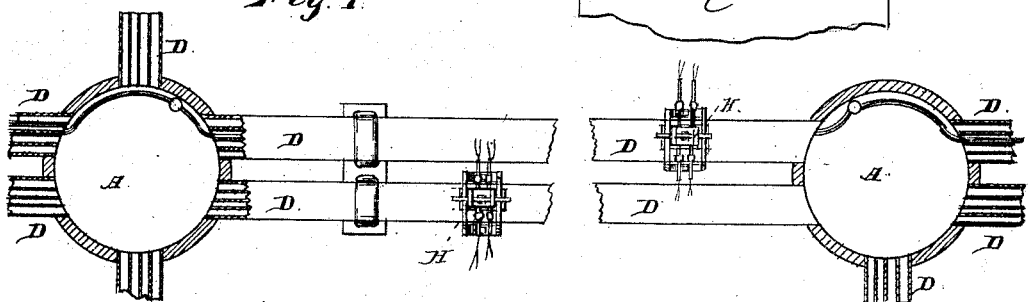
Witnesses:
Harry T. Jones.
Albert H. Adams.
Inventor:
Benezette Williams

UNITED STATES PATENT OFFICE.

BENEZETTE WILLIAMS, OF CHICAGO, ILLINOIS.

UNDERGROUND ELECTRICAL CONDUIT.

SPECIFICATION forming part of Letters Patent No. 354,290, dated December 14, 1886.

Application filed October 16, 1885. Serial No. 180,116. (No model.)

*To all whom it may concern:*

Be it known that I, BENEZETTE WILLIAMS, residing at Chicago, in the county of Cook and State of Illinois, and a citizen of the United States, have invented a new and useful Improvement in Underground Electrical Conduits, of which the following is a full description, reference being had to the accompanying drawings, in which—

Figure 1:
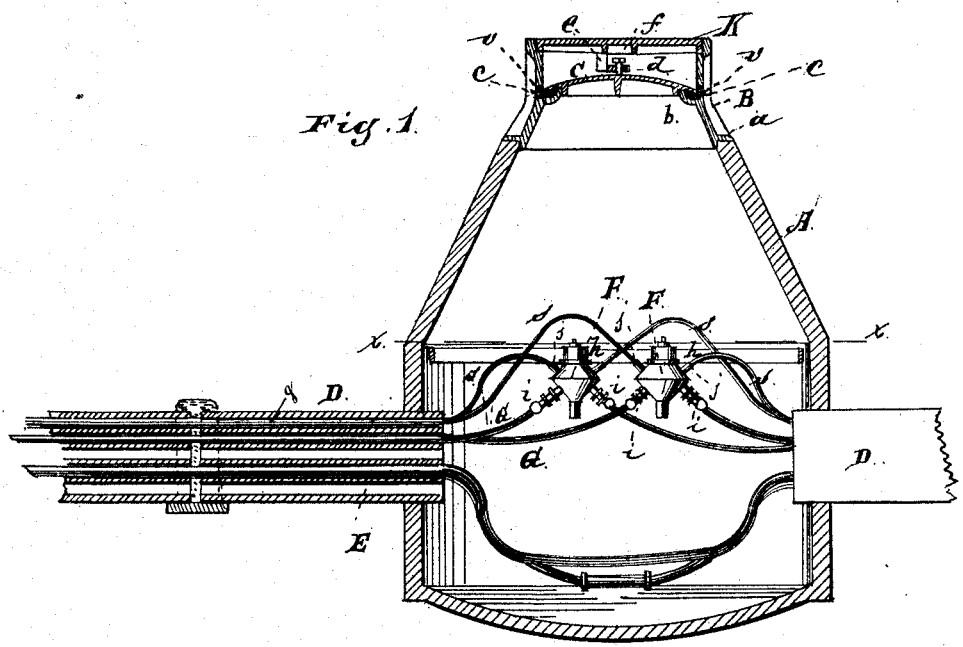
Figure 2:
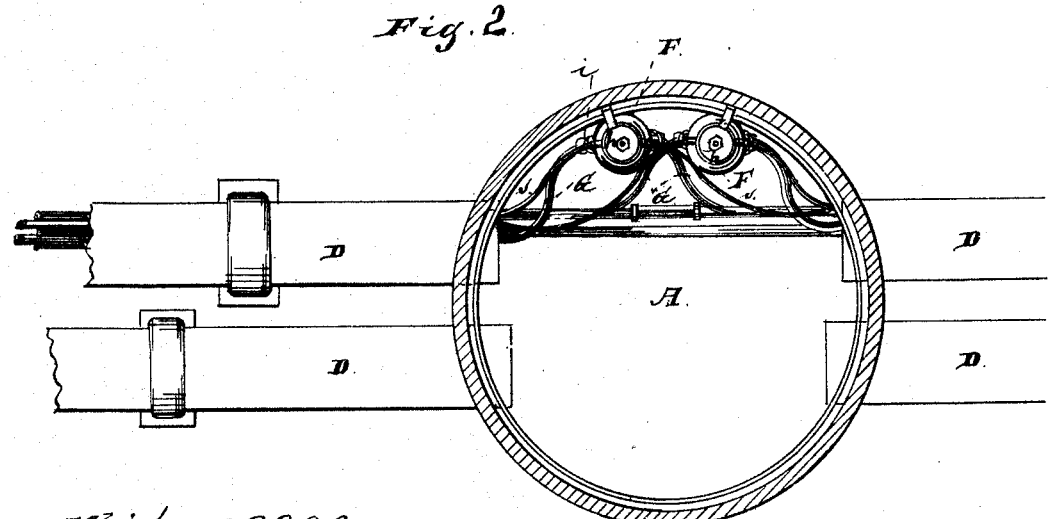

Figure 1 is a vertical section; Fig. 2, a horizontal section at line $x$ of Fig. 1; Fig. 3, an enlarged sectional detail of a splice-box with cables and wires entering and going out therefrom. Fig. 4 is a side elevation showing a section of a conduit with my local-service splicing-box attached. Fig. 5 is a section at line $x$ of Fig. 4. Fig. 6 is a top view of the parts therein shown. Fig. 7 is a detail on a small scale, part being in plan and part in section.

Underground conduits for electric wires are now much used, man-holes being provided at suitable distances apart to allow access to cables.

The principal object of my invention is to provide means for leading electric conductors for local use off from a main electric conductor or from a group of conductors, to be broken only at a man-hole, and connecting the same with a local-service wire leading from the conduit to any desired point, which I accomplish as illustrated in the accompanying drawings.

That which I desire to claim as new will be pointed out in the claims.

In the drawings, A represents the main part of a man-hole of the usual construction.

B is a casting having at its lower end a flange, $a$, resting on the top of A, B and A being connected together in any known suitable manner.

$b$ is a flange on the inside of B.

$c$ is a packing-ring resting on the flange $b$.

C is a cover resting on the packing $c$.

$d$ is a bar the ends of which enter recesses $e$ on the inside of B, which recesses are of the form designed to receive the pin of a bayonet-catch.

$f$ is a screw passing through $d$, by means of which the cover C can be held securely in place.

K is a second cover.

$v$ are passages through which surface-water which may reach the cover C can pass off to the ground.

D represents a conduit made in any known suitable manner and of any suitable form. As shown in the drawings it is square. The ends of the conduits are secured in the walls of man-holes, as shown, and the conduit is provided with any suitable number of passages, E, for the electric wires or cables.

$g$ are a number of passages designed to receive the wires which connect with the local-service wires, which passages $g$ may be smaller than the passages E.

F are splice-boxes, each having a removable cover, $h$, and openings $i$, through which cables G can enter and pass into the splice-box, and openings $j$, through which wires can pass out from the box. These splice-boxes are supported within the man-hole in the usual manner.

H is a local-service splicing-box which I use for taking out a wire from a main passage of the conduit for local service. This box may be located at any suitable desired point on the conduit over one of the passages $g$, a hole being provided in the wall of the conduit, communicating with the passage from which the wire is to be taken for local service. This service-box, as shown, consists of a case which is open on its under side, the case resting on the top of the conduit, and having one or more screw-threaded openings to receive nipples $k$, or ends of pipes, which nipples $k$ are designed to receive lead-cased wires or cables.

I are two saddles or holding-pieces, of the form shown, the upper and inner edges of which rest upon the flanges $l$ at the bottom of the box H, and these parts I extend down upon opposite sides of the conduits, as shown in Fig. 4.

J is a cross-bar below the conduit, the ends of which enter eyes at the lower ends of short rods $m$, which rods pass through $n$, and are screw-threaded at their ends to receive nuts, by means of which and the parts I J $m$ the box H can be securely held in place upon the conduit. Extending upward from the box are two ears, $o$.

$p$ is a wedge by which the cover $r$ of the box is held in place.

*s* represents single wires which have been separated from the cables G, any one of which wires may be returned through a passage, *g*, to the service-box H, and be there connected with a local-service wire, *w*.

The cables G are made in sections, and the ends of two adjoining sections may be joined in the splice-boxes F in the usual manner, except that a single wire can, if desired, be taken from the cable and be carried to a service-box in the following manner: One of the wires of the cable can be separated therefrom in the splice-box and be there joined to a wire leading from the splice-box through one of the passages *g* to the service-box H, where such wire can be connected with a local-service wire.

In Fig. 3, *t* indicates one of the wires of the cable, spliced at *u* to another wire, *v'*, which passes through one of the passages *g* to the service-box, where it can be joined to a local-service wire, the box then being filled with suitable insulating material.

In Fig. 3, *t'* indicates another wire, spliced at *u'* to a wire, *v²*, which may be carried to another service-box and there joined with a wire for local service.

As many of the service boxes H as may be required may be located between any two of the man-holes, and be arranged to communicate with any one of the passages *g*. A single wire may be carried to each service-box H, or, if desired, a cable composed of two or more wires taken from one of the cables G may be carried to a single service-box, the same being there separated and each joined with a local-service wire.

A local-service wire may be carried to an electric apparatus located at any desired point, and provided with a ground-wire, or with a wire leading from the apparatus to the main conductor or group of conductors, thus forming a local metallic circuit.

What I claim as new, and desire to secure by Letters Patent, is—

1. The combination, with a conduit for electrical conductors, of a local-service splicing-box composed of a case detachably secured to the exterior of the conduit, and having an opening communicating through an opening in the wall of the conduit with the interior of the latter, for leading a conductor from the conduit to connect with a local-service wire outside thereof, substantially as described.

2. In combination with a conduit for electric wires, a local-service splicing-box, H, secured to the conduit at any desired point by means of saddles I and clamping devices J *m*, substantially as and for the purpose specified.

3. The combination of a main electric conduit, a main conductor or group of conductors, one or more single wires separated from such conductor or group of conductors at a manhole, a passage, *g*, in the same conduit for such separated wire or wires, a local-service splicing-box secured to the conduit at any desired point, and a local-service wire leading from the local-service splicing-box to an electric apparatus provided either with a wire connecting with the ground or with a wire joining the main conductor or group of conductors, substantially as and for the purpose specified.

BENEZETTE WILLIAMS.

Witnesses:
ALBERT H. ADAMS,
HARRY T. JONES.